United States Patent [19]
De Jager et al.

[11] Patent Number: 5,666,998
[45] Date of Patent: Sep. 16, 1997

[54] CANTILEVERED SENSOR FOR THE THREAD TENSION DETECTOR

[75] Inventors: Godert De Jager, Volketswil; Frank Lehnert, Rüti; Rolf Benz, Gachnang, all of Switzerland

[73] Assignee: Sulzer Rueti AG, Rueti, Switzerland

[21] Appl. No.: 638,897

[22] Filed: Apr. 24, 1996

[30] Foreign Application Priority Data

May 24, 1995 [EP] European Pat. Off. ............ 95810349

[51] Int. Cl.$^6$ .................... G01L 5/04; G01L 5/10
[52] U.S. Cl. ........................ 139/194; 73/862.474
[58] Field of Search ........................ 139/452, 372, 139/371, 194; 73/862.473, 862.474, 862.634, 862.639, 160

[56] References Cited

U.S. PATENT DOCUMENTS

| | | | |
|---|---|---|---|
| 3,864,966 | 2/1975 | Seitz | 73/141 A |
| 4,023,402 | 5/1977 | Watanabe | 73/88.5 R |
| 4,031,924 | 6/1977 | Domig et al. | 139/371 |
| 4,110,654 | 8/1978 | Paul | 139/371 |
| 4,565,255 | 1/1986 | Sarrazin | 73/862.634 |
| 4,976,158 | 12/1990 | Ginzburg | |
| 5,144,988 | 9/1992 | Del Favero | 139/452 |
| 5,205,327 | 4/1993 | De Jager | 139/370.2 |

FOREIGN PATENT DOCUMENTS 4305795  9/1994  Germany .

OTHER PUBLICATIONS

Patent Abstracts of Japan, vol. 8 No.269 (P-319), Dec. 8, 1984 & JP-A-59 137834 (Marumune Kogyo KK) Aug. 8, 1984.

*Primary Examiner*—Andy Falik
*Attorney, Agent, or Firm*—Townsend and Townsend and Crew LLP

[57] ABSTRACT

A sensor for detecting the stress profile of a thread that has moved. The sensor contains a signal generator, a thread guiding member and a body of resilient material. The signal generator is resiliently mounted in a vibration damping manner and in the manner of a cantilever in a body. Through this mounting arrangement the influence through mechanical action and also the influence of the thermal expansion caused by heat as a result of the heating up caused by the running thread are largely cancelled and thus measurement errors are avoided.

17 Claims, 4 Drawing Sheets

CANTILEVERED SENSOR FOR THE THREAD TENSION DETECTOR

BACKGROUND OF THE INVENTION

TECHNICAL FIELD OF THE INVENTION

The invention relates to a sensor for the detection of a thread tension and to an apparatus with such a sensor and also to a loom with such an apparatus.

SUMMARY OF THE INVENTION

The invention is directed to providing a sensor for detecting the stress profile or tension of a thread that has moved in which the transfer of the force acting on the thread guiding member is substantially improved and the influence of heating is largely cancelled.

With the present invention the cost favorable realization of the sensor and the diverse possibilities of use have proved to be advantageous.

An apparatus with such a sensor has several advantages. The direction of the force transmitted to the signal generator can be set in an advantageous manner through the association of guide elements relative to the guide member of the sensor. Through the resilient, vibration damping and cantilevered mounting of the sensor the influence caused by mechanical action and also the influence caused by heat can be compensated, with the heat being caused by frictional heat. Moreover, the mechanical detuning of the measurement circuit can be avoided which is caused by stresses which may arise during installation.

DETAILED DESCRIPTION OF THE PREFERRED EXEMPLARY EMBODIMENTS

Figure 1:
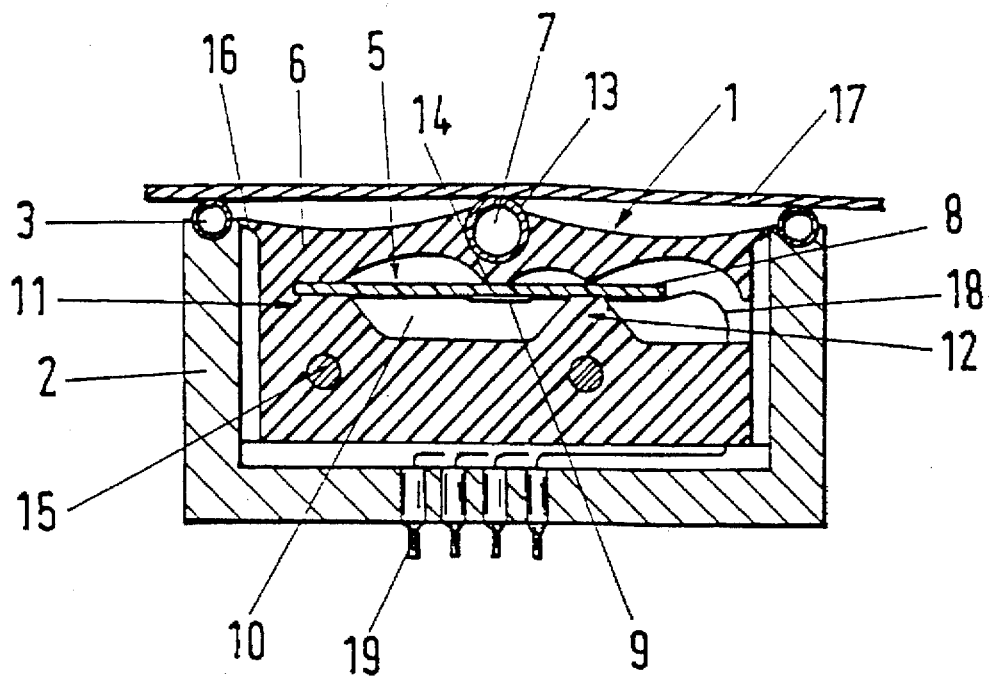
FIG. 1 is a sectional view of a preferred embodiment of an apparatus in accordance with the present invention.

FIG. 1 shows a preferred embodiment of an apparatus shown in section which essentially comprises a sensor 1, a rectangular housing 2 and two thread guiding elements 3. The sensor 1 consists of a signal generator 5, a body 6 0f resilient material, for example silicon rubber, and a thread guiding member 7. The signal generator 5 contains a plate 8, which is elastic in bending, and a measurement circuit 9, which is provided on a surface of the plate. In the body 6 there is formed a cut-out 10 in which the signal generator 5 is resiliently mounted in a resilient, vibration damping and cantilevered manner, with a section of the plate 8 being fixed in the body 6 and forming a fixed mount (or support) 11 and with a section being formed in the cut-out 10 on which the plate 8 lies and forms a loose mount (or support) 12. The thread guiding member 7 is tubular and consists of ceramic material. The thread guiding member 7 is so embedded in the resilient material of the body 6 that a section 13 of the jacket surface of the tube is exposed and a layer 14 of resilient material is present between the tube and the plate 8 of the signal generator 5. The signal generator 5 and the thread guiding member 7 are so arranged in the body 6 that the thread guiding member 7 lies on the side of the plate remote from measurement circuit 9.

The housing 2 is open at one side and has two carrying members 15 for the sensor 1. The carrying members 15 pass through the body 6 of the sensor and are mounted in the side walls of the housing 2, with the mounting advantageously including a fixed mount and a loose mount (not shown). The body 6 is resiliently and freely suspended in a vibration damping manner in the interior of the housing 2. In order to prevent the penetration of contamination, a sealing lip 16 is formed on the body 6 which contacts the inner sides of the housing 2. The thread guiding elements 3 are arranged at the open side of the housing 2 in its end walls. The carrying members 15 and the thread guiding elements 3 are so associated with one another that a thread 17 moved over the apparatus always lies on the thread guiding member 7 in order to achieve a force introduction which is directed vertically onto the signal generator 5.

The connection wires 18 of the measurement circuit 9 are led out via plug elements 19.

Figure 2:
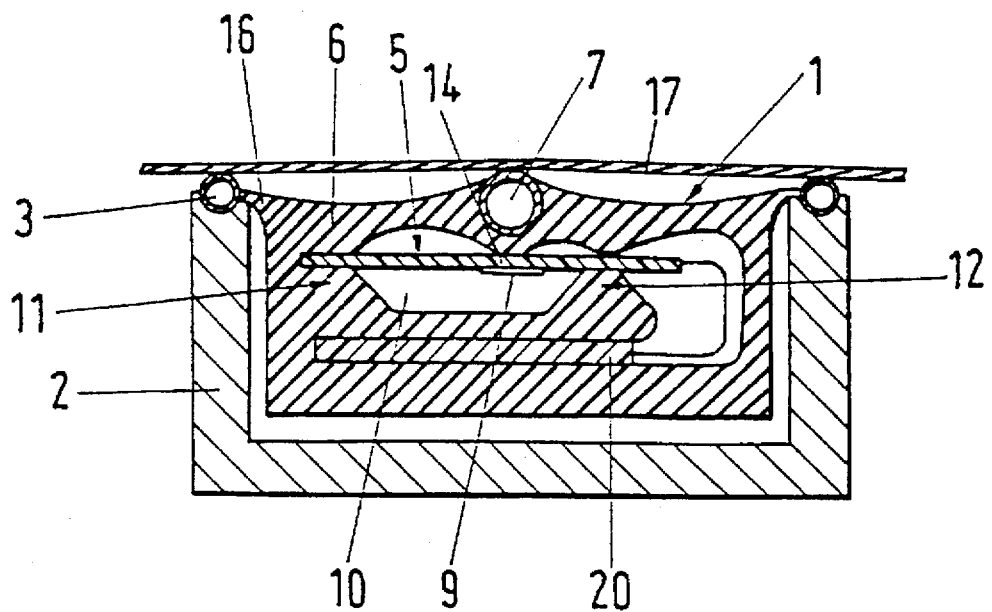
FIG. 2 is a sectional view illustrating a modification of the apparatus of FIG. 1.

The apparatus shown in FIG. 2 has a circuit board 20. This circuit board 20 is so embedded into the body 6 of resilient material beneath the bearing arrangement for the signal generator 5 that the signal transmitting lines between the signal generator 5 and the circuit board 20 are exposed. The circuit board 20 simultaneously serves as a carrying member for the sensor 1. For this purpose the circuit board 20 has a marginal region (not shown) which is secured in the wall of the housing 2.

Figure 3:
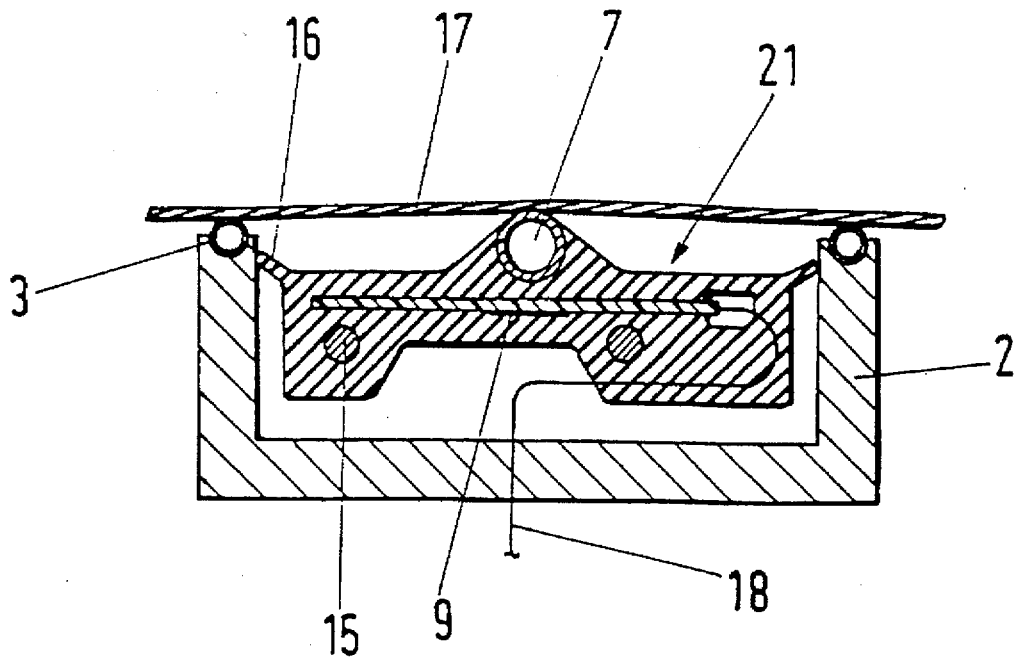
FIG. 3 is a sectional view of a second embodiment of an apparatus in accordance with the present invention.

FIG. 3 shows an apparatus which contains a sensor 21 with a signal generator 5 which is almost fully embedded into the body. The sensor 21 is thus resiliently and freely suspended in a vibration damping manner on the carrier members 15 and is resiliently mounted in a vibration damping and cantilevered manner in the housing 2 via the carrying members 15.

Figure 4:
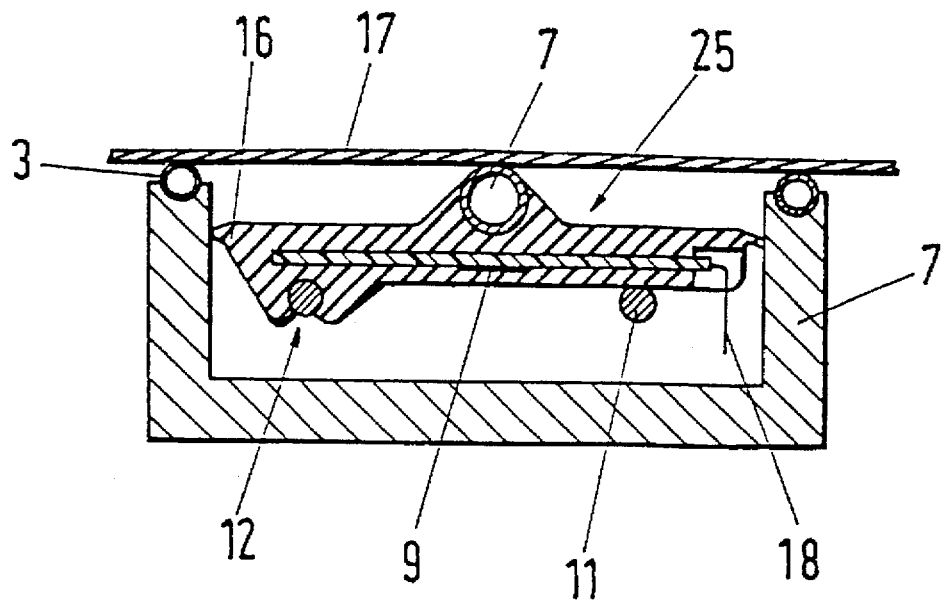
FIG. 4 is a sectional view of a third embodiment of an apparatus in accordance with the present invention.

FIG. 4 shows a sensor 25 with a signal generator 5 which is almost fully embedded into the resilient material and is provided with a mounting arrangement comprising a fixed mount and a loose mount. In this case the carrying members 15 are secured in the side walls of the housing 2.

Figure 5:
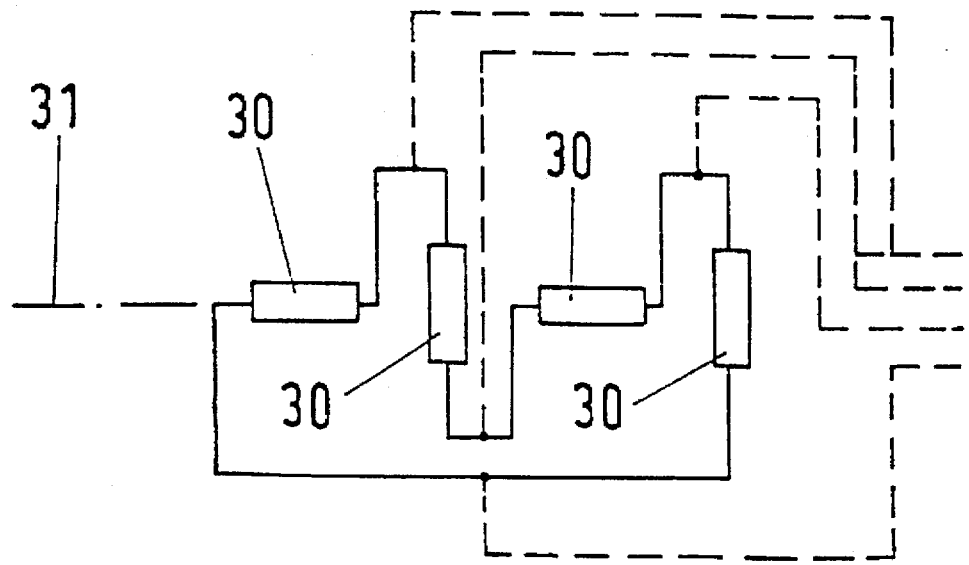
FIG. 5 is a schematic of an embodiment of a measurement circuit in accordance with the present invention.

The measuring circuit 9 is a bridge circuit of resistance elements 30 (FIG. 5, 6). Through the friction which arises during the thread movement at the thread guiding member 7, the thread guiding member 7 warms up. A part of the heat is transmitted via the resilient material to the signal generator 5. This temperature influence is precluded in the bridge circuit 9 in that all resistance pairs are exposed to the same temperature.

Figure 6:
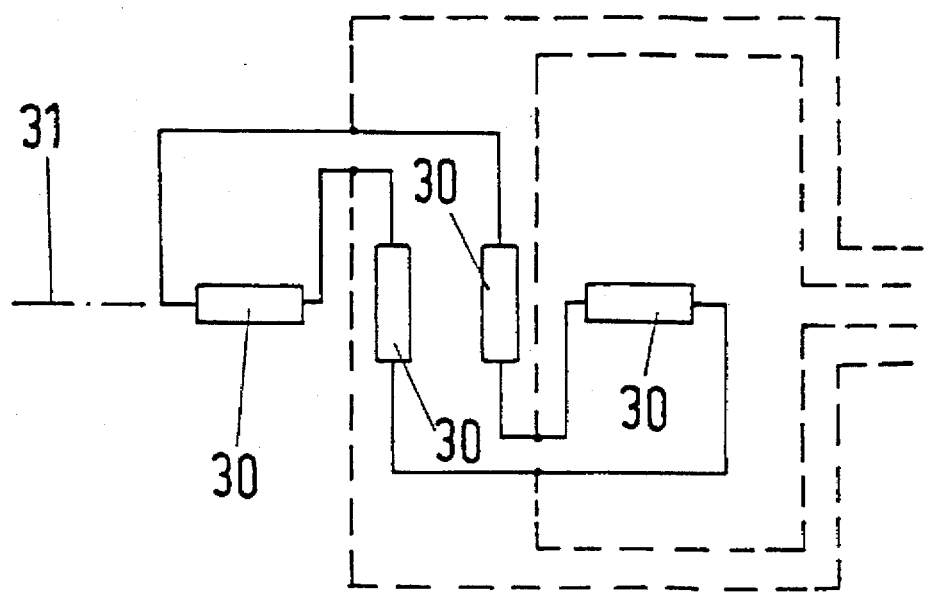
FIG. 6 is a schematic view of another embodiment of a measurement circuit in accordance with the present invention.

The FIGS. 5 and 6 respectively show an arrangement of the resistance elements in accordance with the invention. As FIGS. 5 and 6 show, the resistance elements 30 are mounted symmetrically on the plate 8 about a line 31 extending at right angles to the thread running direction and the resistance elements 30 of each bridge branch are arranged orthogonally to one another.

The thread guiding member 7 and the signal generator 5 are so associated with one another that the thread guiding member 7 is either arranged in or laterally displaced from a vertically extending plane which passes through the line 31.

In order to mount the signal generator 5 under prestress either the layer 14 is made thicker (FIG. 1) or the cut-out for the signal generator 5 in the body has a curved shape (FIG. 3).

Figure 7:
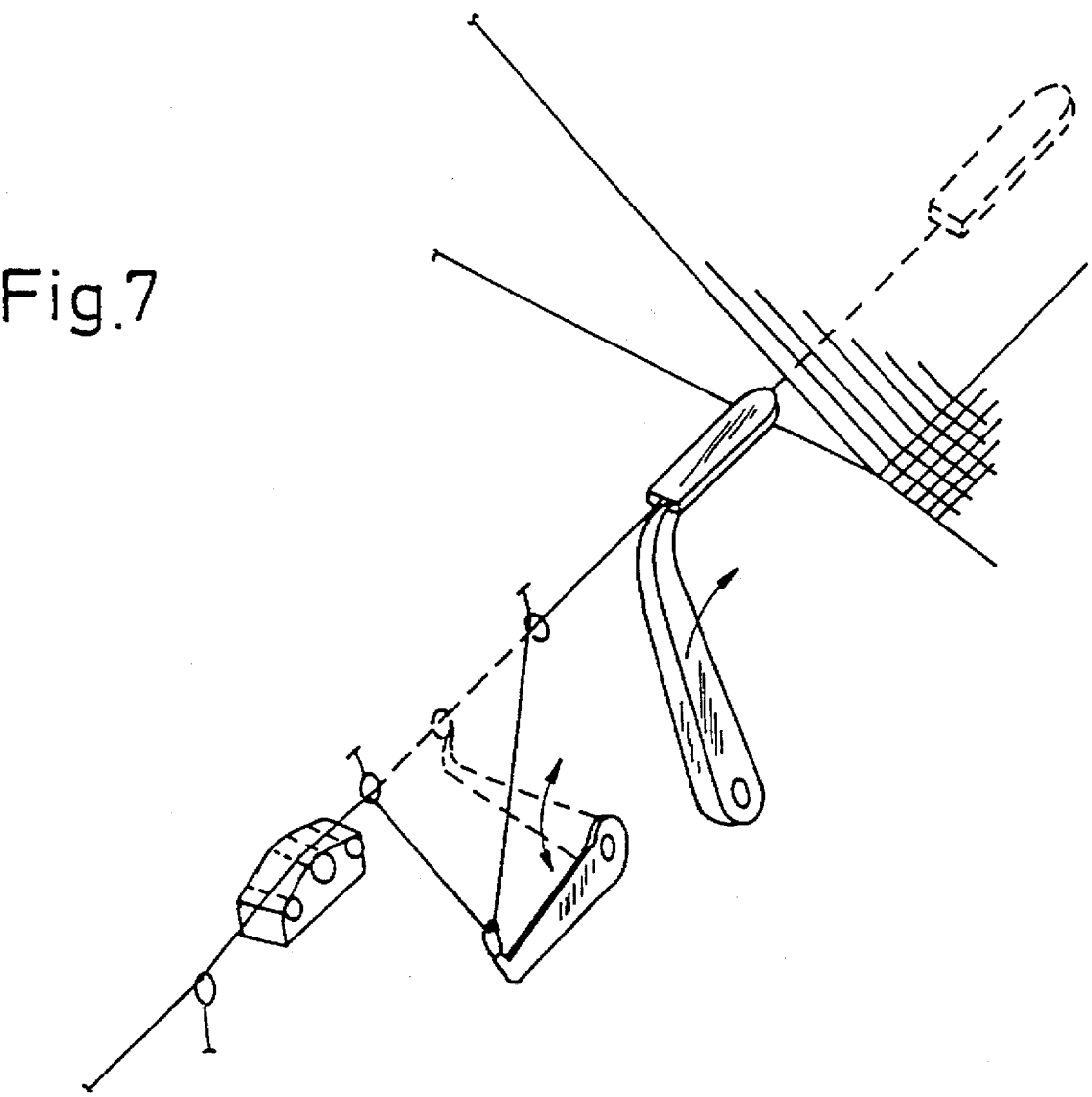
FIG. 7 is a schematic view illustrating one form of use of the apparatus in a projectile weaving machine.

In FIG. 7 a use of the apparatus for the detection of the weft thread tension in a projectile weaving machine is schematically illustrated. FIG. 7 is self-explanatory so that there is no need for a detailed description.

It is pointed out that the sensor 1 can be used on its own in a weaving machine, and attention should be paid to the resilient, vibration damping and cantilevered mounting and the resilient, vibration damping and free suspension. Naturally the sensor or the apparatus with the sensor can also be used to detect the thread tension in rapier weaving machines and air jet weaving machines and generally in textile machines.

The sensor 1 contains a signal generator 5, a thread guiding member 7 and a body of resilient material. The signal generator 5 is resiliently mounted in a vibration damping manner and in the manner of a cantilever in a body 6. Through this mounting arrangement the influence through mechanical action and also the influence of the thermal expansion caused by heat as a result of the heating up caused by the running thread are largely cancelled and thus measurement errors are avoided.

We claim:

1. A sensor for the detection of the stress profile of a thread that has moved, the sensor comprising a signal generator, at least one thread guiding member for guiding thread in a direction of travel substantially parallel with respect to the signal generator and a body of resilient material, with the signal generator being arranged in the body, wherein the signal generator is mounted in a cantilevered manner in the body in order to compensate an influence caused by mechanical action and by heating and in order to thereby prevent the mechanical and electrical detuning of the signal generator.

2. A sensor in accordance with claim 1, wherein the sensor includes a fixed mount and a loose mount for the signal generator.

3. A sensor in accordance with claim 1, wherein the signal generator and the thread guiding member are at least partially embedded in the resilient material.

4. A sensor in accordance with claim 1, wherein the signal generator is fully embedded in the elastic material.

5. A sensor in accordance with claim 1, wherein the signal generator is mounted under pretension.

6. A sensor in accordance with claim 1, wherein the signal generator is mounted free of stress.

7. A sensor in accordance with claim 1, wherein the signal generator comprises a plate which is resilient in bending and a measurement circuit which is formed on the side of the plate remote from the thread guiding member.

8. A sensor in accordance with claim 7, wherein the measurement circuit is a bridge circuit of resistance elements; wherein the resistance elements are arranged symmetrically on the plate along a line extending perpendicular to the thread running direction; and wherein the resistance elements of the bridge branches are respectively arranged orthogonal to one another.

9. A sensor in accordance with claim 7, wherein the thread guiding member is arranged symmetrically parallel or asymmetrically parallel to the measurement circuit.

10. A sensor in accordance with claim 1, further comprising a vibration damping mounting of the signal generator.

11. A sensor in accordance with claim 1, wherein the sensor includes a vibration damping material between the thread guiding member and the signal generator.

12. A sensor in accordance with claim 1, wherein the sensor includes a heat dissipating material between the thread guiding member and the signal generator.

13. An apparatus with a sensor for the detection of the stress profile of a thread that has moved, the sensor comprising a signal generator, at least one thread guiding member for guiding thread in a direction of travel substantially parallel with respect to the signal generator and a body of resilient material, with the signal generator being arranged in the body, the signal generator being mounted in a cantilevered manner in the body in order to compensate an influence caused by mechanical action and by heating and in order to thereby prevent the mechanical and electrical detuning of the signal generator, wherein a mounting arrangement in order to mount the sensor in the manner of said cantilever and by two thread guiding elements which are so arranged relative to the thread guiding member of the sensor is provided such that a thread that is moved over the thread guiding member always lies on the thread guiding member.

14. Apparatus in accordance with claim 13, wherein the mounting arrangement comprises a loose mounting and a fixed mounting.

15. Apparatus in accordance with claim 13 wherein a housing that is open at one side is provided for receiving the sensor and wherein the thread guiding elements are arranged on the housing.

16. Apparatus in accordance with claim 13 wherein the signal generator or the housing is provided with a mounting arrangement.

17. A loom with an apparatus having a sensor for the detection of the stress profile of a thread that has moved, the sensor comprising a signal generator, at least one thread guiding member for guiding thread in a direction of travel substantially parallel with respect to the signal generator and a body of resilient material, with the signal generator being arranged in the body, the signal generator being mounted in a cantilevered manner in the body in order to compensate an influence caused by mechanical action and by heating and in order to thereby prevent the mechanical and electrical detuning of the signal generator, wherein a mounting arrangement in order to mount the sensor in the manner of said cantilever and by two thread guiding elements which are so arranged relative to the thread guiding member of the sensor is provided such that a thread that is moved over the thread guiding member always lies on the thread guiding member, and wherein the apparatus is arranged in the running path of at least one weft thread.

* * * * *